United States Patent
Watanabe et al.

[11] Patent Number: 6,072,495
[45] Date of Patent: Jun. 6, 2000

[54] OBJECT SEARCH METHOD AND OBJECT SEARCH SYSTEM

[75] Inventors: Kenshiu Watanabe, Hitachiota; Yutaka Kanou, Fujisawa, both of Japan

[73] Assignee: Doryokuro Kakunenryo Kaihatsu Jigyodan, Tokyo, Japan

[21] Appl. No.: 09/060,301

[22] Filed: Apr. 15, 1998

[30] Foreign Application Priority Data

Apr. 21, 1997 [JP] Japan .................................. 9-103189

[51] Int. Cl.[7] .................................................. G06F 15/00
[52] U.S. Cl. ........................................................ 345/419
[58] Field of Search ................................. 345/419, 420, 345/421, 423, 433

[56] References Cited

U.S. PATENT DOCUMENTS

| | | | |
|---|---|---|---|
| 4,821,214 | 4/1989 | Sederberg | 364/522 |
| 4,994,989 | 2/1991 | Usami et al. | 345/419 |

FOREIGN PATENT DOCUMENTS

| | | |
|---|---|---|
| 0 436 790 A2 | 7/1991 | European Pat. Off. . |
| 0 650 131 A1 | 4/1995 | European Pat. Off. . |
| 39 08 684 A1 | 9/1990 | Germany . |
| 196 21 788 A1 | 3/1997 | Germany . |
| 195 49 306 A1 | 7/1997 | Germany . |
| 63-5478 | 1/1988 | Japan . |
| 9-27046 | 1/1997 | Japan . |

OTHER PUBLICATIONS

Ahuja, Narendra et al., "Octree Representations of Moving Objects", Computer Vision, Graphics, and Image Processing 26 (1984), pp. 207–216

Hoel, Erik G., et al. "Benchmarking Spatial Join Operations with Spatial Output", Proceedings of VLDB '95, pp. 606–618, 1995.

*Primary Examiner*—Phu K. Nguyen
*Attorney, Agent, or Firm*—Oliff & Berridge, PLC

[57] ABSTRACT

In a search method and system for reducing the number of memory page-in/page-out operations to display, three dimensional objects are extracted through space search. The system comprises a parameter accepting module (22) which accepts parameters from a user to set up a view volume, a space searching module 24 which searches for an object which is included in the view volume, a tree holding module (28) which holds a multi-dimensional tree describing the three-dimensional coordinates of the object, and a file reading module (29) which loads the object data into memory in file units.

11 Claims, 10 Drawing Sheets

OBJECT SEARCH METHOD AND OBJECT SEARCH SYSTEM

BACKGROUND OF THE INVENTION

1. Field of the Invention

This invention relates to an object search method and an object search system for use in three-dimensional image processing performed by a computer, and more particularly to a method for reading data satisfying a search condition from three-dimensional object data stored in a storage unit and to a system using the method.

2. Description of the Related Art

Various techniques have been proposed for processing a large amount of data in a limited memory. For example, in the world of computer graphics (CG), there are applications such as a driving simulation which requires the viewpoint to change frequently. Such applications store the three-dimensional coordinates of all objects, such as those of buildings or roads used in the simulation, in a large-volume auxiliary storage unit (hereafter called a storage unit) such as an external magnetic disk unit.

In most cases, the amount of data for these objects is too large to reside in a main memory in which simulation is executed. To solve this problem, a computer system uses virtual storage in which a large program or a large amount of data is divided into fixed-sized memory units called pages. These pages are brought into (page in) or out of (page out) memory as instructed by the operating system.

In computer graphics, processing called clipping is performed for rendering objects in a visual field. For example, when a distant view of a street is displayed on the screen, many objects such as buildings are shown. As the street is zoomed in, the number of objects shown on the screen is decreased. The visual field space is called a view volume. In other words, clipping divides the objects on the screen into two, visible parts and invisible parts depending upon whether or not they are within in the view volume, and then removes the invisible parts. This processing displays a smooth, natural image on the screen according to the eyepoint.

FIG. 1 shows a relation between the view volume and the objects. As shown in the figure, a view volume 2 is set up by such factors as the position of a eyepoint O, a line-of-sight vector V, the position of a front clipping plane 4, the position of a back clipping plane 6, a horizontal visual field angle, and a vertical visual field angle. The determination of the view volume is similar to selecting a container in which objects are contained. In FIG. 1, perspective projection is used to display a three-dimensional object on a two-dimensional screen. As a result, the view volume 2 is a truncated pyramid with the visual point O as the summit.

When the objects included in the view volume 2 are displayed, the view volume 2 is set up and, at the same time, object data is read. Because the amount of this data is large, as much of the object data as can be contained in main memory is loaded through the virtual storage feature and then the coordinates of the loaded object are transformed through viewing transformation. FIG. 1 shows two objects, 8 and 10, after coordinate transformation. Then, this object data is paged out, and the next data is paged in for which coordinate transformation is performed.

Next, clipping is performed. In FIG. 1, object 8, which is not contained in the view volume 2, is removed while object 10, which is contained in the view volume 2, is not. After clipping is performed on all objects in this manner, the objects contained in the view volume 2 in whole or in part are loaded into main memory again through the virtual storage feature for "rasterizing." Rasterizing, also called rendering, applies textures (patterns) or colors to the surfaces of the objects. Thus, necessary processing is performed only on necessary object data selected from a large mount of data to produce natural images.

However, the virtual storage feature, which divides data into pages of a predetermined size mechanically, sometimes divides data of one object into two pages as shown in FIG. 2. Processing of this object data requires two pages, meaning that if the object data is small but the page is large, a relatively large amount of data must be paged in and then paged out. In fact, the system is impractical for application, such as a driving simulation, in which data must be swapped frequently.

SUMMARY OF THE INVENTION

This invention seeks to solve the problems described above. It is an object of this invention to provide a method and a system which reduce the time required to read data of a desired three-dimensional object from a storage unit by reducing the number of read operations. It is another object of this invention to provide a method and a system which use a new clipping technique to efficiently search for a desired object and therefore to reduce the time required before three-dimensional data is read.

(1) The object search method according to the present invention relates to a method of reading out data of objects satisfying a search condition from a storage unit which stores data on a plurality of objects. The method according to the present invention may comprise steps of:

(a) Setting up a search condition for the three-dimensional coordinates specifying a three-dimensional space region to be searched in order to search the three-dimensional space for a desired object, and (b) Reading, one file at a time, files containing data of three-dimensional objects satisfying the search condition from the storage unit.

Once a search condition is given in the form of three-dimensional coordinates specifying a region in the three-dimensional space, data of a three-dimensional object which satisfies the condition is read out from the storage unit, one file for each object at a time. This significantly reduces the number of data swap operations (page-in, page-out operations) compared to virtual storage in which data is divided into fixed-sized pages. In addition, the method according to the present invention, which does not depend on the OS (Operating System) to the degree that conventional virtual storage features do, ensures flexibility in design for implementation.

Another aspect of the present invention comprises the steps of:

(a) Setting up a multi-dimensional tree composed of a plurality of nodes each corresponding to an object and each containing a key composed of a maximum and a minimum of three-dimensional coordinate values of the object, (b) setting up a search condition describing a condition for the three-dimensional coordinate values;

(c) searching for an object satisfying said search condition by comparing a plurality of keys of each node of said multi-dimensional tree against said search condition; and (d) Reading data on a three-dimensional object satisfying the search condition from the storage unit, one file at a time.

Here, a "multi-dimensional tree" refers to a tree which contains the maximum values and the minimum values of the three-dimensional coordinates of objects for use in searching for a desired object based on the relationship among the objects. A 6-d (6 dimensional) tree is an example of a multi-dimensional tree.

This preferred form also solves the problems involved in the conventional virtual storage feature and, in addition, improves efficiency in searching through the multi-dimensional tree, thus speeding up the processing that must be done before reading data.

In a situation where the search condition constantly changes, another aspect of the present invention reads only data associated with a difference between the previous search result and the current search result. In many cases, the display data on the three-dimensional space, such as that in a driving simulation, is generated by keeping track of the player's eyepoint. Because the eyepoint moves continuously, much display data for a scene is used also for the next scene. This means that reading only the difference between the two contiguous scenes greatly reduces the processing time.

(2) The object search system according to the present invention uses a storage unit containing data on the three-dimensional objects. This object search system comprises view volume data accepting means for accepting data specifying a view volume, tree holding means for holding a multi-dimensional tree composed of a plurality of nodes each corresponding to an object and each having a key composed of a maximum value and a minimum value of three-dimensional coordinates of the object, space searching means for searching the multi-dimensional tree for an object according to a search condition specified as the three-dimensional coordinate values of the view volume in order to find the objects included in the view volume, and reading means for reading, one file at a time, the three-dimensional data on the objects included in the three-dimensional region to be searched according to the search result.

In the system with this configuration, the view volume data accepting means accepts data identifying the view volume, such as a visual point specified by the user. The space searching means uses the multi-dimensional tree to search for objects included in the specified view volume. The reading means reads from the storage unit the three-dimensional data on the objects according to the search result, one file at a time. Like the method described in (1), the system with this configuration solves the problems involved in the conventional standard virtual storage feature.

The system may also be configured such that the space searching means reads only the difference between the previous search result and the current search result and sends this difference to the reading means so that the reading means reads the data only on the difference. This configuration further speeds up the processing.

DESCRIPTION OF PREFERRED EMBODIMENTS

A preferred embodiment of the space search system according to the present invention is described with reference to the attached drawings.

[1] System Configuration

Figure 1:
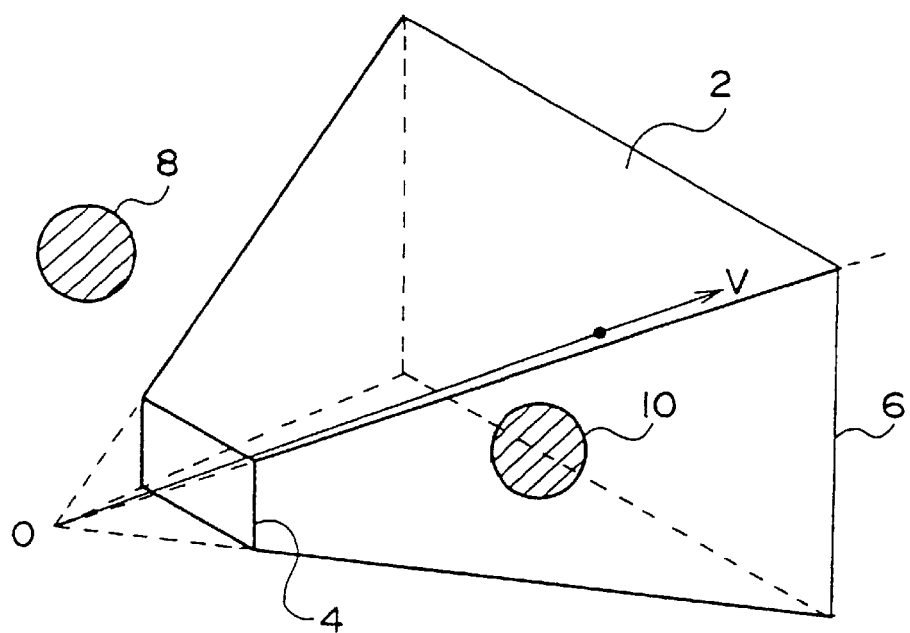
FIG. 1 is a diagram showing a relation between a view volume and objects.
Figure 2:
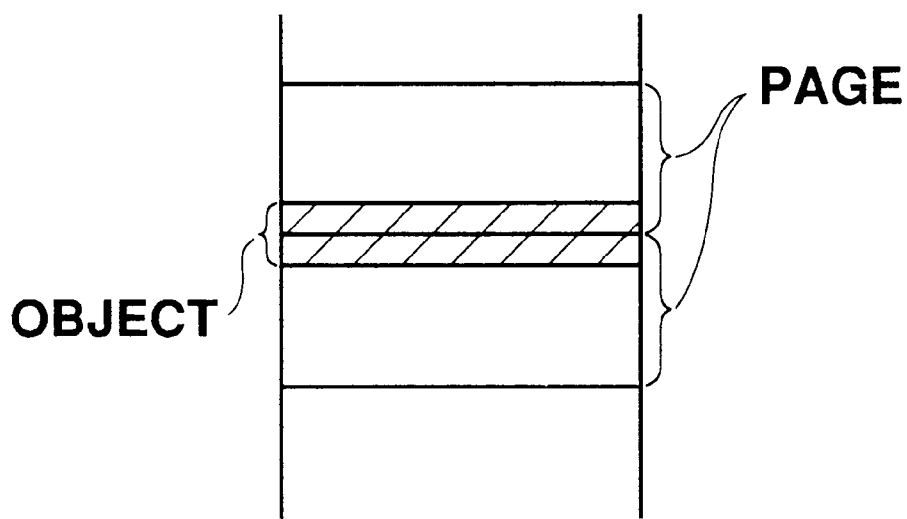
FIG. 2 is a diagram showing object data which extends across two pages in virtual storage.
Figure 3:
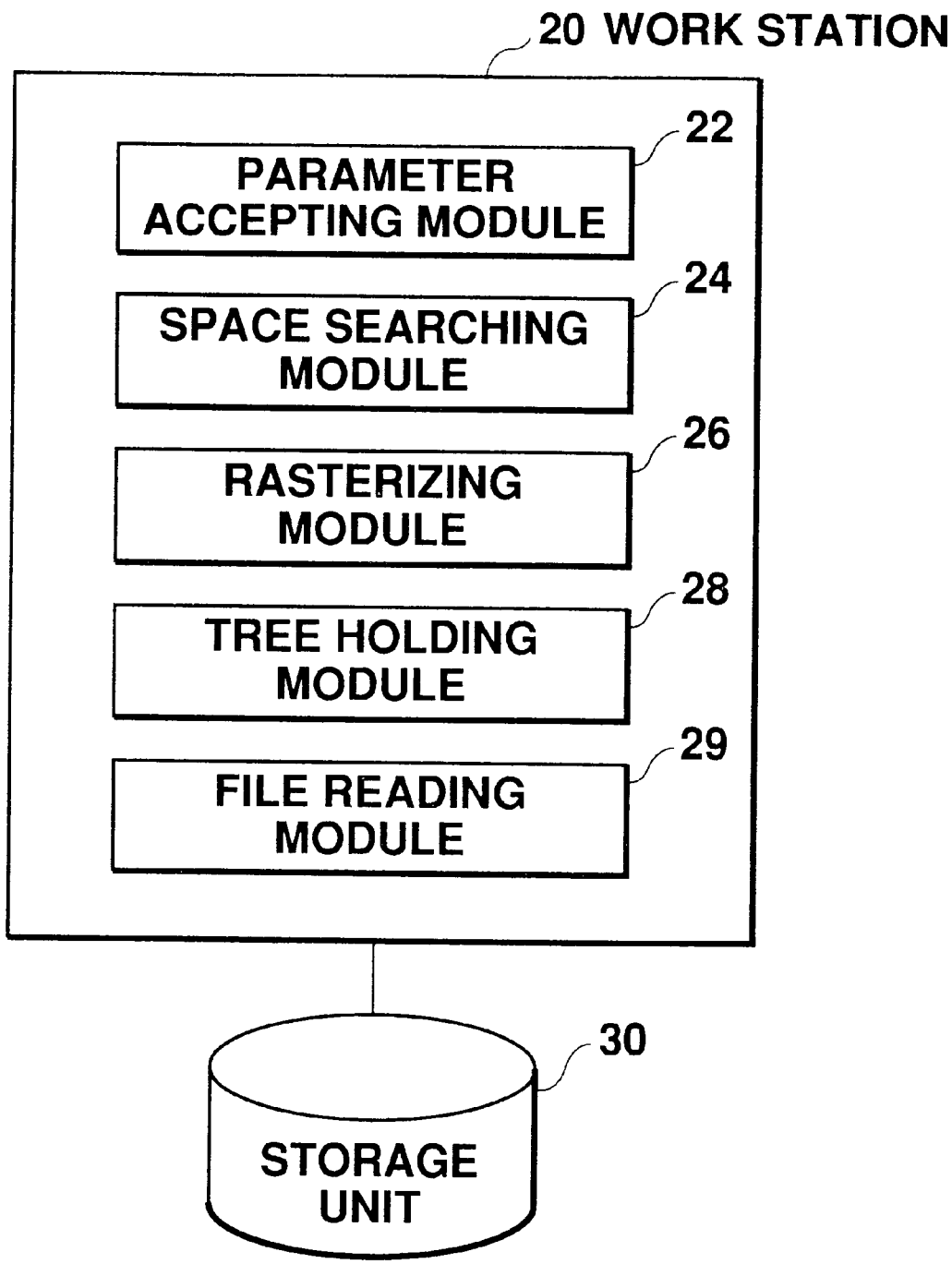
FIG. 3 is a diagram showing the configuration of a space search system of an embodiment according to the present invention.

FIG. 3 is a diagram showing the configuration of the space search system used in the present invention. This space search system may be implemented by a stand alone workstation. This embodiment of the present invention is capable of fast space search and allows even a standard workstation to search for and display data in real time.

As shown in FIG. 3, the system comprises a workstation 20 and an internal or an external auxiliary storage unit 30. The external storage unit 30, which may be a magnetic disk unit, an optical storage unit, or a magnetic optical disk unit, contains coordinate data on the objects.

The workstation 20 has a parameter accepting module 22 which accepts user input specifying an area to be drawn. This area to be drawn is treated as a view volume. The module 22 requests the user to enter parameters which specify the view volume, such as an eyepoint location. Entered parameters are sent to a space searching module 24. Upon receiving the entered parameters, the space searching module 24 performs clipping using a 6-d tree held in a tree holding module 28 residing in the main memory of the workstation 20. The 6-d tree, which is referenced frequently during a search, is loaded into the tree holding module 28 from the auxiliary storage unit 30 before clipping is begun. The result of clipping, or the result of the search, is sent to a file reading module 29. The space searching module 24 temporarily stores the previous search result and sends only a difference between the previous search result and the current search result to the file reading module 29.

The file reading module 29 checks the difference and reads necessary object data, one file at a time, from the storage unit 30. File data that is read is overwritten on unnecessary file data. (This operation corresponds to the page-in and page-out operation in the conventional system).

A rasterizing module 26 rasterizes file data and displays it on the screen.

[2] 6-d Tree

This system uses a 6-d tree. A technique for using a k-d tree for a plane search is described in "Multidimensional binary search trees used for associative searching" by J. L. Bentley, Communications of the ACM vol.18, No.9, 509–517 1975 or in "Geographical data structures compared: A study of data structures supporting region queries" by J. B. Rosenberg, IEEE Trans. on CAD, Vol. CAD-4, No. 1, 53–67, January 1985. This embodiment extends the technique described in those papers into a space search. A 6-d tree is a k-d tree where the number of keys (k) is 6. A k-d tree is a binary tree used in a binary search where the number of search keys is k. The following explains those trees in order of a 1-d tree, a 2-d tree, and a 6-d tree.

(1) 1-d Tree

Figure 4:
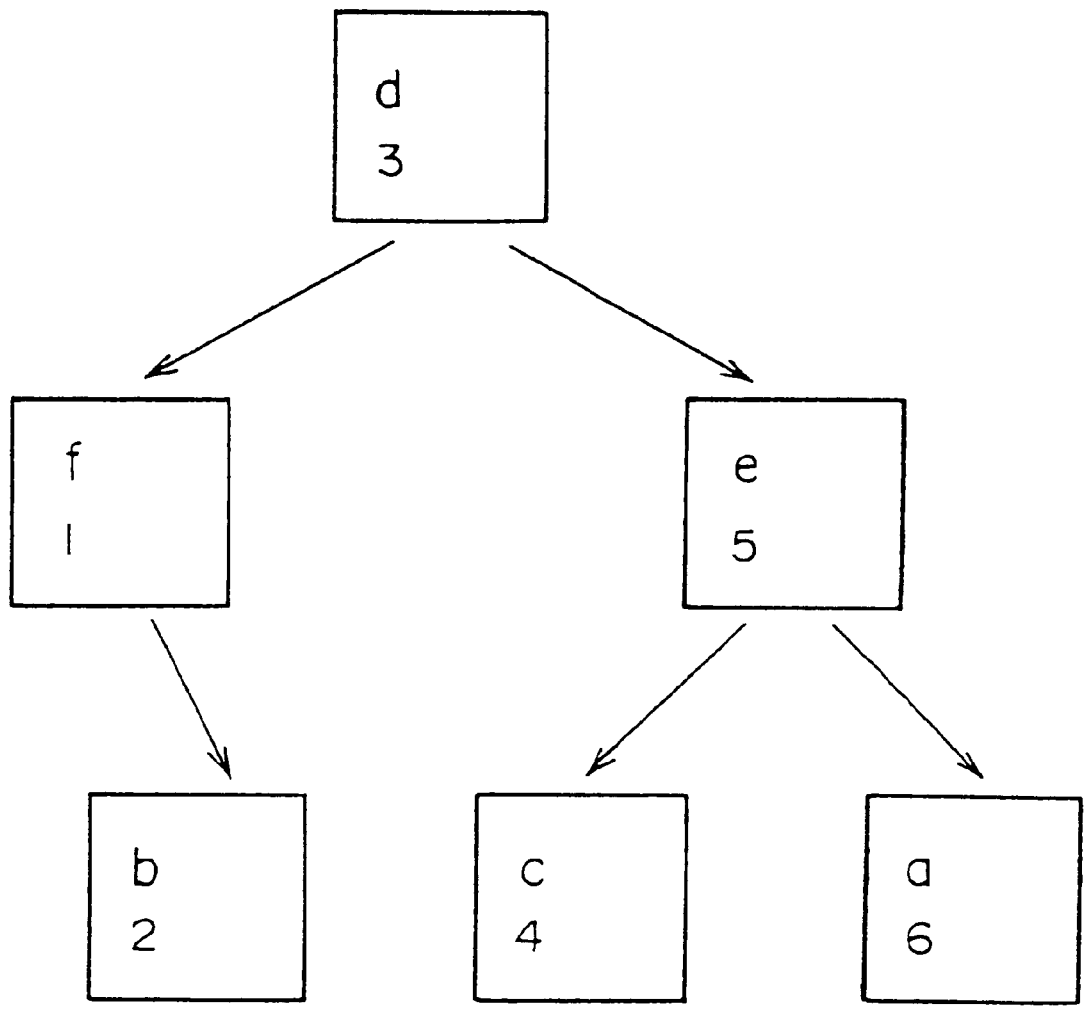
FIG. 4 is a diagram showing an example of a 1-d tree.

A 1-d tree is a simple binary tree. FIG. 4 shows an example of a 1-d tree. As shown in the figure, the tree has six nodes, a to f, each having its own key (numeric data). The root is node d, the children (represented as chd) of the root are nodes f and e, and leaves are nodes b, c, and a. The rule for generating a 1-d tree is as follows:

Rule 1. For any node x, $K(x) \geq K$ (ptree; root=left_chd (x))

Rule 2. For any node x, $K(x) < K$ (ptree; root=right_chd (x))

where, K is a key, and K(i) is the key of node i. "ptree; root=left_chd (x)" and "ptree; root=right_chd (x)" are any nodes included in the subtree "ptree" whose root is the left child node of x or the right child node of x respectively.

In this 1-d tree, a region search is possible. For example, if we are given the following condition, Condition: K<3 then, nodes f and b satisfy the condition. To find these two nodes, a check is first made to see if the root, node d, satisfies the above condition. Because the key of node d, 3, exceeds the upper bound of the condition, there is no need to check the nodes in the subtree whose root is the right child of the node d. Thus, once a search condition and key relations are given, a desired node can be found quickly.

(2) 2-d tree

A 2-d tree allows desired nodes to be found quickly when conditions are given to two keys. These two keys, independent of each other, must be included in one tree.

Figure 5:
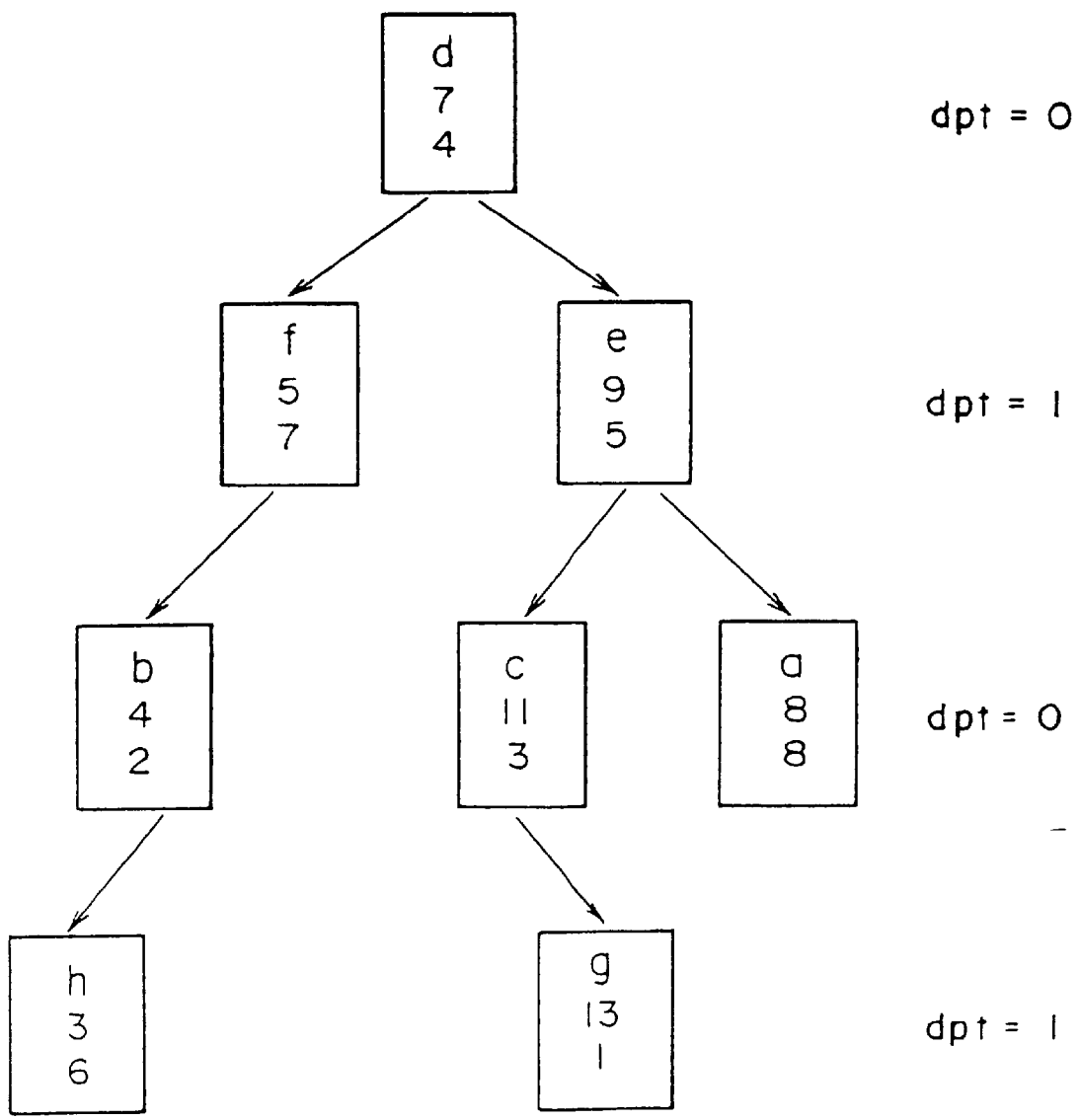
FIG. 5 is a diagram showing an example of a 2-d tree.

FIG. 5 shows an example of a 2-d tree in which there are eight nodes, a to h, each having two keys. For convenience, the top key is called "the 0th key", and the bottom key "the 1st key". The depth of node d (represented as D) at the root level is defined as 0, the depth of nodes d and e at the second level is defined as 1, and so on, with the depth of level n being (n−1). An indicator "dpt" is defined as follows:

dpt=D mod k

Because k, the number of keys, is 2, dpt is a repetition of 0 and 1. Rules for generating this tree is as follows:

Rule 1 For the dpt-th key K(x, dpt) in any node x, K(x, dpt)≥K (ptree; root=left_chd (x), dpt)

Rule 2 For the dpt-th key K(x, dpt) at node x, K(x, dpt)<K (ptree; root=right_chd (x), dpt)

These rules are explained with reference to FIG. 5. For node d at the root, dpt=0. Hence, rules 1 and 2 are rewritten as follows.

Rule 1. The 0th key of node d is equal to or greater than the 0th key of any node in the subtree whose root is node f which is the left child of node d. In FIG. 5, this is true because "7" (node d) is greater than "5" (node f), "4" (node b), and "3" (node h).

Rule 2. The 0th key of node d is less than 0th key of any node in the subtree whose root is node e which is the right child of node d. In the figure, this is true because "7" is less than "9", "11", "8", and "13".

Hence, node d and the subordinates nodes are related by the 0th key.

Next, consider node e. Because dpt=1 for node e, rules 1 and 2 are rewritten as follows:

Rule 1. The 1st key of node e is equal to or greater than the 1st key of any node in the subtree whose root is node c which is the left child of node e. In the figure, this is true because "5" is greater than "3" and "1".

Rule 2. The 1st key of node e is less than the 1st key of any node in the subtree whose root is node a which is the right child of node e. In the figure, this is true because "5" is less than "8".

Hence, node e and the subordinates nodes are related by the 1st key. Thus, a node with dpt=0 and the subordinate nodes of the node are related by the 0th key, and a node with dpt=1 and the subordinate nodes of the node by are related by the 1st key. A 2-d tree, which has two keys, may be treated like the binary tree described in (1) once a node is selected.

Figure 6:
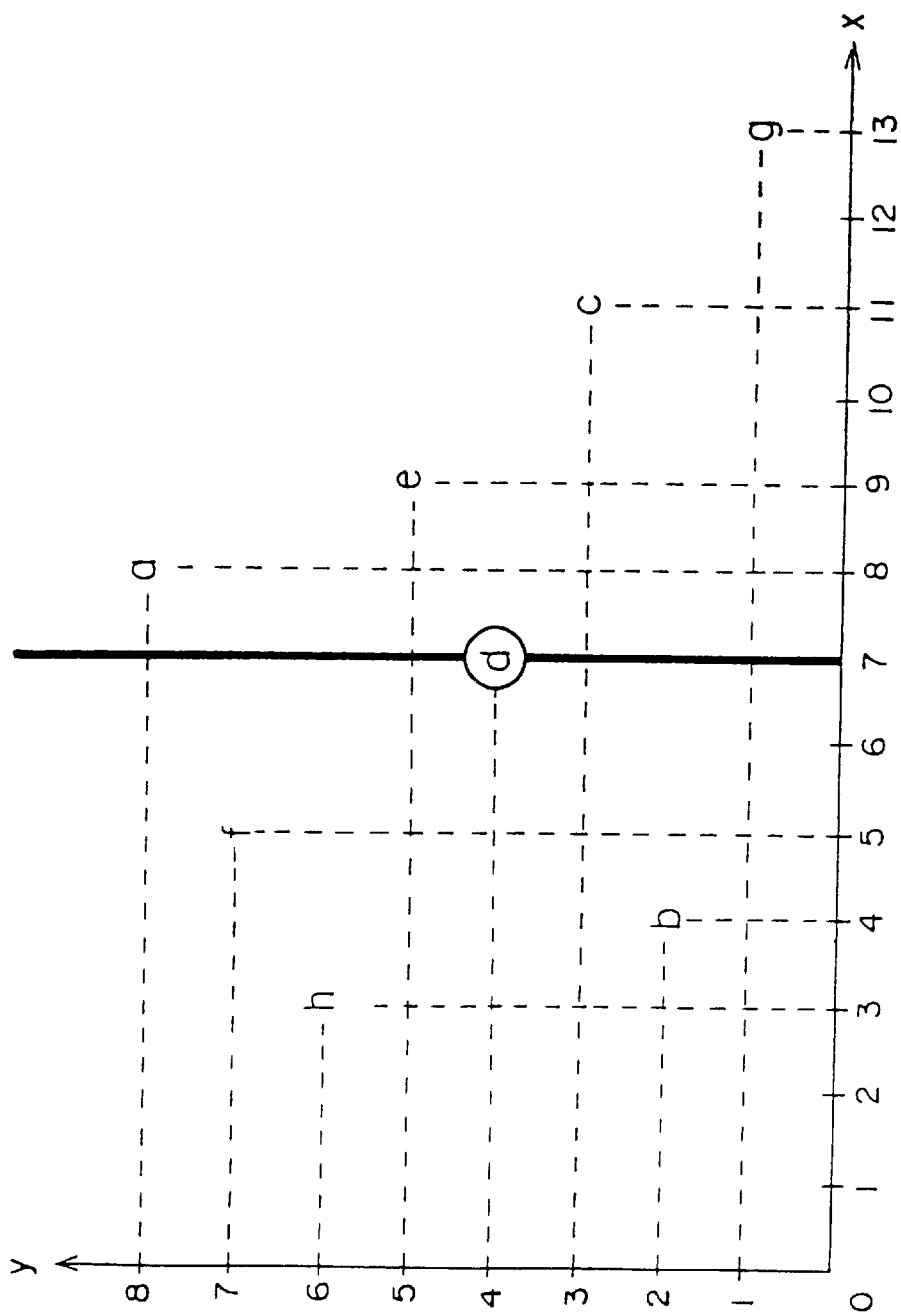
FIG. 6 is a diagram showing a relation between the 2-d tree and a two-dimensional area.
Figure 7:
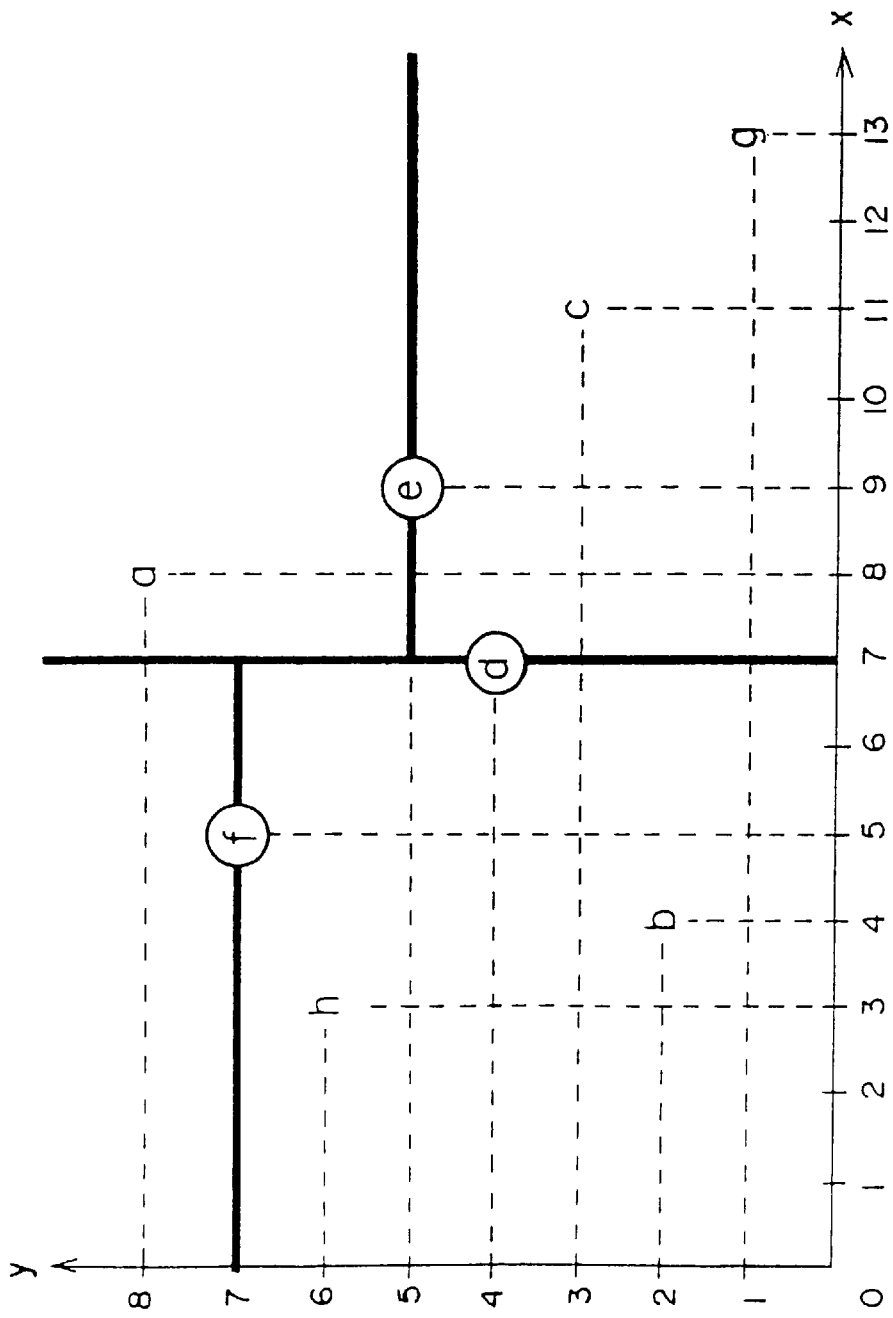
FIG. 7 is a diagram showing a relation between the 2-d tree and the two-dimensional area.
Figure 8:
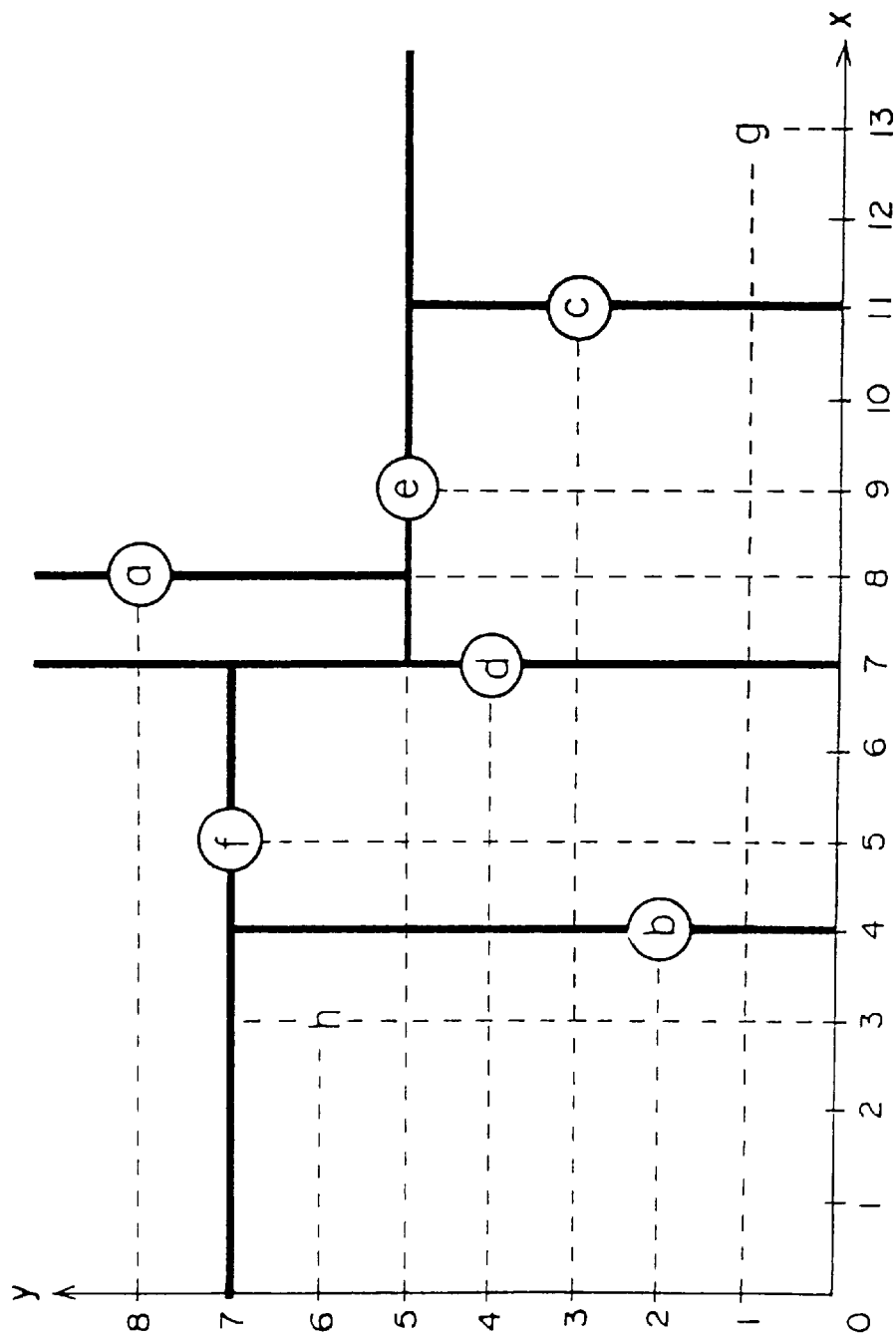
FIG. 8 is a diagram showing a relation between the 2-d tree and the two-dimensional area.

FIGS. 6 to 8 show the relationship between the 2-d tree and the two-dimensional region. In this figure, the x-axis is in the direction of the 0th key and the y-axis is in the direction of the 1st key. First, as shown in FIG. 6, the region is divided into two by node d (X=7). A node below node d belongs to one of two regions.

Next, as shown in FIG. 7, each region is divided into two by nodes f (y=7) and node e (y=5). In FIG. 8, each region is further divided by nodes b (x=4), c (x=11), and a (x=8). Therefore, it is apparent that a new node with any key belongs to one of two-dimensional regions shown in FIG. 6 and other figures, meaning that the node may be connected to the 2-d tree as a leaf. That is, a node finds its place in the tree no matter which node is selected as the root.

A 2-d tree generated as described above makes enables us to make a two-key region search. For example, suppose that the following two search conditions are given:

Condition 0: 0th key>7

Condition 1: 1st key>6

Under these conditions, only node a is selected.

In the selection process, first, a check is made to see if node d, the root, satisfies condition 0. Because the 0th key of node d(=7) does not satisfy the lower bound, it is determined that node f (the left child of node d) and the subordinate nodes do not satisfy the condition.

On the other hand, a check is made to see if node e, which satisfies condition 0, satisfies condition 1. Because the 1st key of node e(=5) does not satisfy the lower bound of condition 1, it is determined that node c (the left child of node e) and the subordinate nodes do not satisfy the condition. A repetition of this check efficiently narrows down candidate nodes.

(3) 6-d tree

A 2-d tree allows us to make a two-key search, meaning that we can search for a point in a desired region in the x-y plane. Similarly, the use of four keys, described as $X_{min}$, $X_{max}$, $Y_{min}$, $Y_{max}$, allows us to define the nodes as a rectangular region in the x-y plane.

A 6-d tree has six keys. In this embodiment, these keys are assigned to the values, $Xi_{max}$, ..., of object i. That is, the 0th key to the 5th key are assigned to $Xi_{min}$, $Yi_{min}$, $Zi_{min}$, $Xi_{max}$, $Yi_{max}$, $Zi_{max}$. The tree generation rules, not shown, are the same as those for a 2-d tree, except that k is 6 in the following depth calculation formula:

dpt=D mod k

A node in a 6-d tree thus generated may be defined as a region with a volume in the x-y-z space; that is it may be defined as a box, or a rectangular parallelepiped. In a 6-d tree used in this embodiment, a node represents a bounding box (described later) corresponding to an object with six numeric values, such as $Xi_{max}$, being the keys of the node. In this embodiment, the system performs clipping using this 6-d tree under the search condition specified by six numeric values of a reference box which will be described later.

[3] Operation

Figure 9:
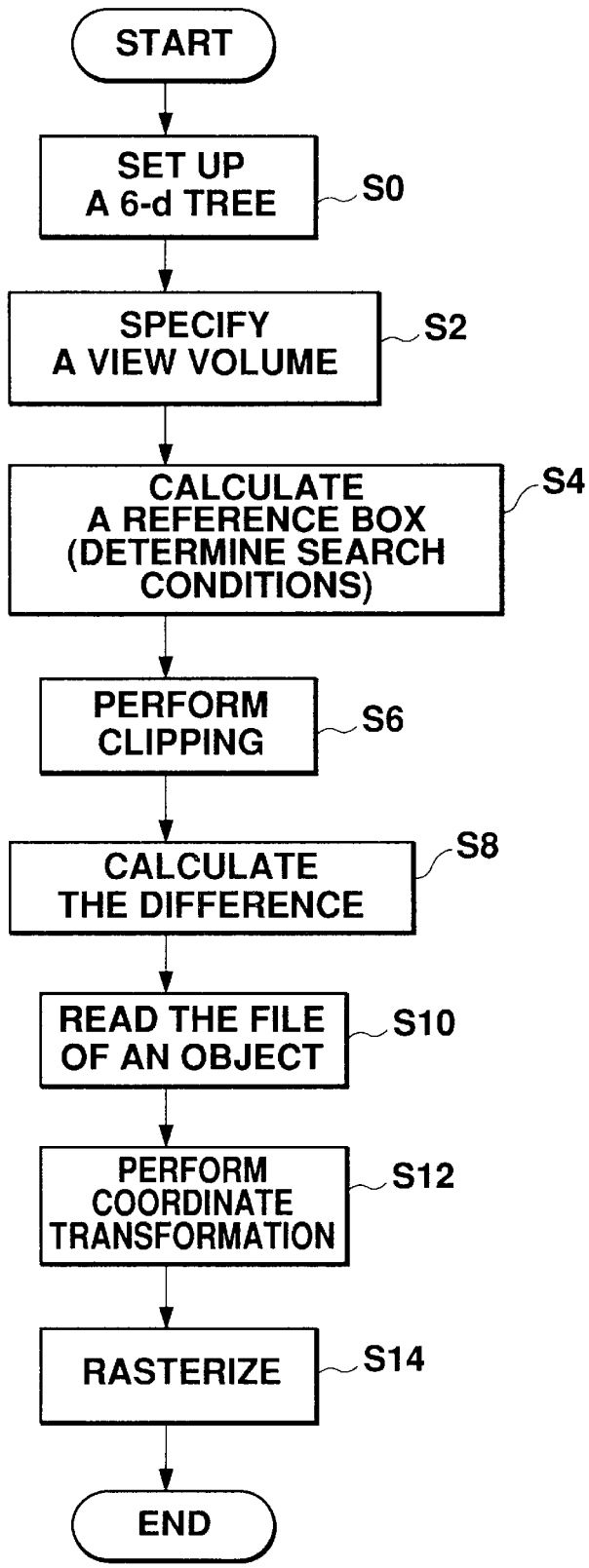
FIG. 9 is a flowchart showing an operating procedure for a space search system used in the embodiment.

The embodiment with the above configuration operates as follows. FIG. 9 is a flowchart showing the operating procedure of a space search system used in this embodiment. Before operation is begun, a 6-d tree is loaded into the tree holding module 28. (S0)

As shown in FIG. 9, the system first prompts a user to specify a view volume (S2). The parameter accepting module 22 accepts user-specified parameters for transmission to the space searching module 24.

Then, the space searching module 24 calculates a reference box for the view volume (S4). The "reference box" is a rectangular parallelepiped which circumscribes the view volume with the sides of the box (that is, width, height and depth) parallel to the x-, y-, and z-axes, respectively. Thus, the reference box may be described by six x-, y-, and z-coordinates (represented as $xs_{max}$, $xs_{min}$, $ys_{max}$, $ys_{min}$, $zs_{max}$, $zs_{min}$) which are the maximum and the minimum coordinate values of the eight vertexes of the reference box. On the other hand, a rectangular parallelepiped which circumscribes the object is called a "bounding box." For the bounding box, the i-th object may be similarly described by six values, $xi_{max}$, $xi_{min}$, $yi_{max}$, $yi_{min}$, $zi_{max}$, and $zi_{min}$, which are the maximum and minimum coordinate values of the eight vertexes of the bounding box. The values for the bounding box, such as $xi_{max}$, need not be calculated because they are included in the 6-d tree as keys.

Figure 10:
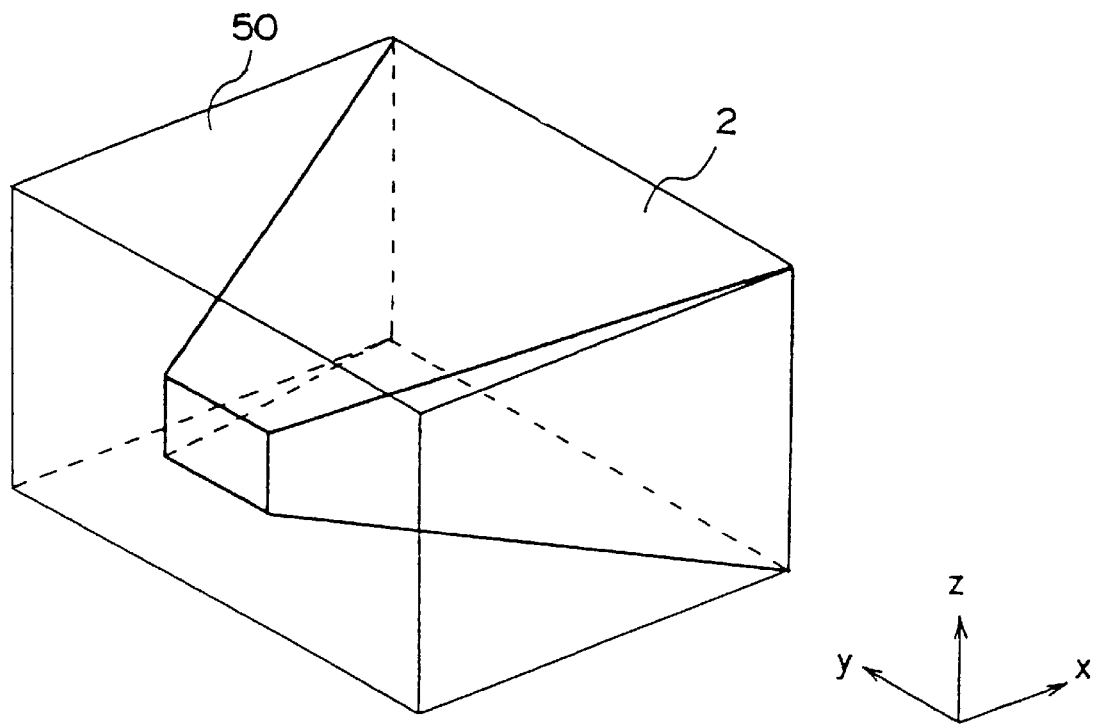
FIG. 10 is a diagram showing a reference box.
Figure 11:
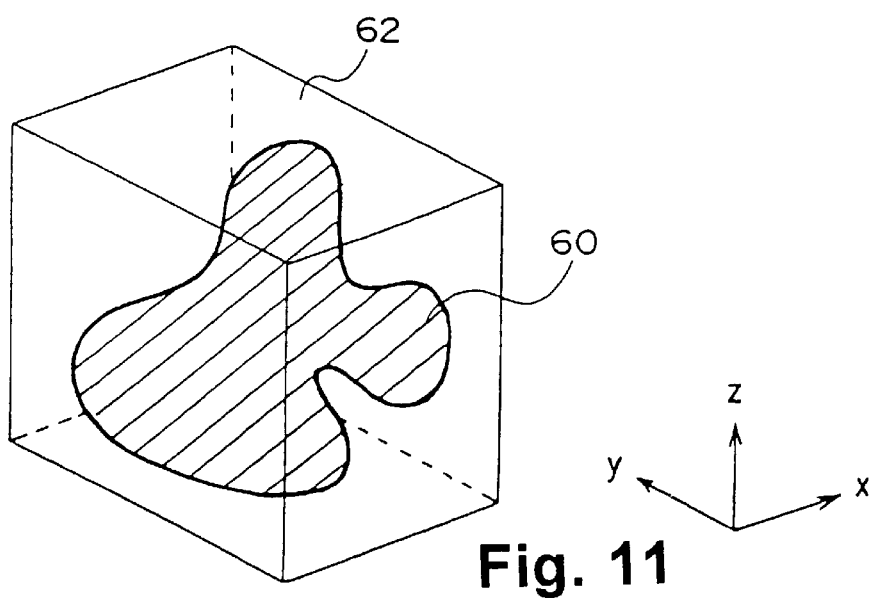
FIG. 11 is a diagram showing a bounding box.

FIG. 10 shows a reference box, while FIG. 11 shows a bounding box. As shown in FIG. 10, the view volume 2 is circumscribed by the reference box 50. The two faces of the six faces of the reference box 50 are determined by a front clipping plane and a back clipping plane, with the remaining four faces automatically determined based on the two faces. On the other hand, an object 60 is circumscribed by a bounding box 62 as shown in FIG. 11. The object 60, which is usually much smaller than the view volume 2, is magnified in FIG. 11. The sides (width, height and depth) of the bounding box 62 are parallel to the sides of the reference box 50. That is, with the three perpendicular sides of the reference box 50 as the x-, y-, and z coordinate axes, the bounding box 62 is determined such that its three perpendicular sides are parallel to the x-, y-, and z-axes. Therefore, simply comparing the maximum and the minimum coordinate values in each of x-, y-, and z-axis directions enables us to determine whether or not the bounding box 62 is included in the reference 50. Finding the reference box and bounding boxes is equivalent to finding the values of the view volume, such as $xs_{min}$, and the values of the object, such as $xi_{min}$. The following operation is performed using these values.

Next, the space searching module 24 performs clipping for each bounding box with respect to the reference box by making a conditional search in the 6-d tree (S6). For example, the search conditions for a bounding box to be completely included in the reference box are the following six.

Condition 0: the 0th key $xi_{min} \geq xs_{min}$
Condition 1: the 1st key $yi_{min} \geq ys_{min}$
Condition 2: the 2nd key $zi_{min} \geq zs_{min}$
Condition 3: the 3rd key $xi_{max} \leq xs_{max}$
Condition 4: the 4th key $yi_{max} \leq ys_{max}$
Condition 5: the 5th key $zi_{max} \leq zs_{max}$ In this stage, any object which can be at least partly visible is selected. For example, a search for a bounding box whose y- and z-coordinate values are completely included in the ranges of y-coordinate and z-coordinate of the reference box respectively, but whose x-coordinate values are not completely included in the range of x-coordinate of the reference box, may be made by changing only condition 0 to Condition 0: the 0th key $xi_{min} < xs_{min}$ or by changing only condition 3 to Condition 3: the 3rd key $xi_{max} > xs_{max}$.

Considering a bounding box, a part of which sticks out of the reference box only in x or y direction, a search for a bounding box, a part of which sticks out of the reference box only in one direction (x, y, or z) may be made by not referencing one of conditions 0 to 5.

Similarly, a search for bounding boxes partly sticking out of the reference box in two directions (x and y, y and z, or z and x) may be made as follows:
(Condition 0 or 3 not referenced)×(Condition 1 or 4 not referenced)+(Condition 0 or 3 not referenced)×(Condition 2 or 5 not referenced)+(Condition 1 or 4 not referenced)×(Condition 2 or 5 not referenced).

Where operator "×" indicates the logical AND, while operator "+" indicates a logical OR. A search for bounding boxes partly sticking out of the reference box in three directions (x, y and z) may be made by (Condition 0 or 3 not referenced)×(Condition 1 or 4 not referenced)×(Condition 2 or 5 not referenced).

In summary, the combinations of conditions to be used to search for a bounding box which is at least partly contained in the reference box are:

(Condition 0 or 3)×(Condition 1 or 4)×(Condition 2 or 5) ... (1)

The logical expression (1) can be expanded in 8 combinations of conditions. For each of these eight combinations, bounding boxes that may be included in the reference box are selected.

It should be noted that there is a bounding box with a side longer than that of the reference box. For example, for a very high building, the z-direction range of the reference box are sometimes exceeded. In such a special case, conditions 2 and 5 are as follows:

Condition 2: the 2nd key $zi_{min} < zs_{min}$
Condition 5: the 5th key $zi_{max} > zs_{max}$ If both conditions are satisfied at the same time (this is called condition 6), then (condition 2 or 5) in expression (1) should be changed to (condition 2 or 5 or 6). This applies also in the x and y directions. Clipping is achieved using this search process.

Next, the space searching module 24 finds the difference between the result of the previous clipping and that of the current clipping (S8). For example, if the reference box which preciously included objects a, b, c, and d now includes objects b, c, d, and e, data on the deleted object 'a' becomes unnecessary, while data on a new object 'e' becomes necessary. Thus, the difference information is that "object 'a' may be discarded and object 'e' must be loaded." Upon receiving this difference information, the file reading module 29 reads the file of object 'e' from the storage unit 30 and overwrites it over the data on object 'a' (S10).

Then, coordinate transformation is performed on the objects loaded in memory (S12). In this embodiment, the load of a computer system for coordinate transformation is reduced because of the preselection in step S6.

After coordinate transformation, detailed clipping is performed on the objects. Rough clipping was performed in S6 to select all objects which may potentially be at least partly visible. In this stage, detailed clipping is performed to divide even the same object into those parts to be included in the view volume 2 and those not to be included in the view volume 2. The rasterizing module 26 then rasterizes the parts of the objects to be included in the view volume 2 (S14) before displaying them on the screen.

The system operates as described above. Although a stand alone system is used in this embodiment, a server-client system may also be used, in which case the server provides the space search service and sends search results to a client as the difference information. This difference information allows the client to load only the files that are necessary and to rasterize them for display. In this type of server-client system, object data may be shared among many clients. For example, when there are two clients, one of them displays right-eye video data and the other displays left-eye video data to build a pseudo three-dimensional system.

While there has been described what is at present considered to be the preferred embodiment of the invention, it will be understood that various modifications may be made thereto, and it is intended that the appended claims cover all such modifications as fall within the true spirit and scope of the invention.

What is claimed is:

1. An object search method of searching for and reading out data of a three-dimensional object from a storage unit, said storage unit containing the one data file for each object, said method comprising the steps of:

(a) setting up a search condition for three-dimensional coordinates specifying a three-dimensional region to be searched; and (b) reading data on the three-dimensional object satisfying said search condition from said storage unit, one file at a time.

2. The method according to claim 1, further comprising the step of inputting information on the three-dimensional coordinates specifying a view volume, wherein said search condition is determined by a maximum value and a minimum value of the three-dimensional coordinates of said view volume in said step (a).

3. The method according to claim 1, wherein only the data on the difference between a previous search result and a current search result is read from said storage unit when the search is made by changing said search condition in said step (b).

4. An object search method of searching for and reading out data of a three-dimensional object from a storage unit, said storage unit containing the one data file for each object, said method comprising the steps of:

(a) setting up a multi-dimensional tree composed of a plurality of nodes each corresponding to an object and each containing a key composed of a maximum and a minimum of three-dimensional coordinate values of the object;

(b) setting up a search condition describing a condition for the three-dimensional coordinate values;

(c) searching for an object satisfying said search condition by comparing a plurality of keys of each node of said multi-dimensional tree against said search condition; and (d) reading out data on the object satisfying said search condition from said storage unit, one file at a time.

5. The method according to claim 4, wherein said search condition is for the maximum and the minimum of the three-dimensional coordinates of a view volume and wherein said step (c) includes a step of searching for an object at least partly included in said view volume.

6. The method according to claim 5, further comprising the step of reading only data on the difference between a previous search result and a current search result from said storage unit when the search is made by changing said search condition.

7. The method according to claim 4, wherein the method is executed in a computer system comprising a main memory and an auxiliary storage unit, wherein said storage unit is the auxiliary storage unit, and wherein the data of the object read out in said step (d) is loaded into said main memory.

8. The method according to claim 4, further comprising the step of performing predetermined coordinate transformation on the data of the object read out in said step (d) for clipping.

9. An object search system for searching a three-dimensional space for an object, comprising:

(a) a storage unit for storing data on three-dimensional objects, with one file for each object;

(b) view volume data accepting means for accepting data specifying a view volume;

(c) tree holding means for holding a multi-dimensional tree composed of a plurality of nodes each corresponding to an object and each having keys composed of a maximum value and a minimum value of three-dimensional coordinates of the object;

(d) space searching means for determining a three-dimensional region to be searched based on the view volume data accepted by said view volume data accepting means and, for searching for an object included in the three-dimensional region based on a comparison between the keys of each node in the multi-dimensional tree held in said tree holding means and the three-dimensional region to be searched; and (e) reading means for reading, one file at a time, from said storage unit the data on the object included in the three-dimensional region according to a search result of said space searching means.

10. The system according to claim 9, wherein said multi-dimensional tree is a 6-d tree.

11. The system according to claim 9, wherein said space searching means calculate a difference between a search result of a previous search and the search result of a current search and send the difference to said reading means as the search result and wherein, said reading means read from said storage unit a file containing data on the object corresponding to the difference based on said difference received from the searching means.

* * * * *